United States Patent
Weh et al.

(10) Patent No.: US 10,150,458 B2
(45) Date of Patent: Dec. 11, 2018

(54) HYDRAULICS BLOCK AND HYDRAULIC UNIT

(71) Applicant: Robert Bosch GmbH, Stuttgart (DE)

(72) Inventors: Andreas Weh, Sulzberg (DE); Matthias Mayr, Rettenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/345,459

(22) Filed: Nov. 7, 2016

(65) Prior Publication Data
US 2017/0137005 A1 May 18, 2017

(30) Foreign Application Priority Data

Nov. 12, 2015 (DE) .................. 10 2015 222 286

(51) Int. Cl.
| | |
|---|---|
| B60T 8/36 | (2006.01) |
| B60T 8/40 | (2006.01) |
| F04B 9/02 | (2006.01) |
| F04B 17/03 | (2006.01) |
| F04B 23/02 | (2006.01) |

(52) U.S. Cl.
CPC ............ B60T 8/4031 (2013.01); B60T 8/368 (2013.01); B60T 8/4022 (2013.01); F04B 9/02 (2013.01); F04B 17/03 (2013.01); F04B 23/025 (2013.01); *B60T 8/4018* (2013.01)

(58) Field of Classification Search
CPC ... B60T 8/36; B60T 8/368; B60T 8/40; B60T 8/4022; B60T 8/4031
USPC ........ 417/415; 60/591; 303/87, 116.4, 119.3, 303/DIG. 10
See application file for complete search history.

(56) References Cited

U.S. PATENT DOCUMENTS

| | | | | |
|---|---|---|---|---|
| 5,620,311 | A * | 4/1997 | Wetzel ................. | B60T 8/4022 417/360 |
| 5,742,109 | A * | 4/1998 | Volz ........................ | B60T 8/368 310/89 |
| 5,758,930 | A * | 6/1998 | Schiel ..................... | B60T 7/042 188/358 |
| 5,826,952 | A * | 10/1998 | Feigel ...................... | B60T 7/12 303/119.2 |
| 6,347,843 | B1 * | 2/2002 | Murayama .............. | B60T 8/348 303/10 |
| 6,478,554 | B1 * | 11/2002 | Dinkel .................... | B60T 8/368 239/589 |
| 7,293,495 | B2 * | 11/2007 | Dinkel .................... | B60T 8/368 417/415 |
| 2004/0244371 | A1 * | 12/2004 | Takumori ................ | B60T 8/368 60/591 |
| 2005/0052078 | A1 * | 3/2005 | Kondo .................... | B60T 8/368 303/119.3 |

(Continued)

*Primary Examiner* — Christopher P Schwartz
(74) *Attorney, Agent, or Firm* — Norton Rose Fulbright US LLP; Gerard Messina

(57) ABSTRACT

A hydraulics block having a piston-cylinder unit that can be driven by an electric motor via a gear in order to generate a brake pressure for a hydraulic non-muscular-energy vehicle brake system. An annular cavity is provided which encloses a piston of the piston-cylinder unit inside a cylinder, as a leakage chamber which communicates with a reservoir. Possible drag leakage is carried away in this manner. An end shield situated between the electric motor and the gear prevents lubricant or leakage from entering the electric motor.

7 Claims, 2 Drawing Sheets

(56) References Cited

U.S. PATENT DOCUMENTS

| | | | | |
|---|---|---|---|---|
| 2005/0146210 | A1* | 7/2005 | Hinz | B60T 8/368 |
| | | | | 303/119.3 |
| 2007/0228820 | A1* | 10/2007 | Nakamura | B60T 8/3225 |
| | | | | 303/119.3 |
| 2008/0084108 | A1* | 4/2008 | Crimpita | B60T 8/368 |
| | | | | 303/87 |
| 2008/0106145 | A1* | 5/2008 | Hinz | B60T 8/3225 |
| | | | | 303/152 |

* cited by examiner

HYDRAULICS BLOCK AND HYDRAULIC UNIT

CROSS REFERENCE

The present application claims the benefit under 35 U.S.C. § 119 of German Patent Application No. DE 102015222286.1 filed on Nov. 12, 2015, which is expressly incorporated herein by reference in its entirety.

FIELD

The present invention relates to a hydraulics block for a hydraulic vehicle brake system, and to a piston-pump unit which includes such a hydraulics block. In particular, the hydraulics block and the piston-pump unit are provided to generate a brake pressure in a hydraulic non-muscular-energy brake system and/or to generate a brake pressure and to deliver brake fluid in the direction of wheel brakes and/or in the direction of a master brake cylinder in a slip-controlled hydraulic vehicle brake system.

BACKGROUND INFORMATION

Conventional hydraulics blocks for slip-controlled vehicle brake systems are typically cuboidal blocks made from metal, in particular an aluminum alloy, which have machined receptacles for hydraulic components of a slip control, such as solenoid valves, non-return valves, piston pumps, hydraulic accumulators and damping chambers. The receptacles are usually stepped-diameter blind holes in the hydraulics block, into which the hydraulic components of the slip control are inserted and mechanically held in place and sealed in a pressure-tight manner by caulking, for example. The hydraulic components are hydraulically interconnected through bore holes of the hydraulics block. Slip controls of this type are anti-lock braking controls, traction controls, dynamic driving controls, and/or electronic stability programs, for which the abbreviations ABS, ASR, FDR and ESP are commonly used. The enumeration is by way of example and is not complete.

SUMMARY

An example hydraulics block according to the present invention is for a hydraulic vehicle brake system, especially a non-muscular-energy brake system. The hydraulics block has a piston-cylinder unit for generating a brake pressure and/or for delivering brake fluid with the aid of a cylinder and a piston which is axially displaceable inside the cylinder. The cylinder is accommodated inside a receptacle of the hydraulics block in a fluid-tight manner. The receptacle for the cylinder may be a blind hole or a through hole in the hydraulics block. The sealing of the cylinder in the receptacle of the hydraulics block need not be pressure-tight and, in particular, need not be resistant to a brake pressure, even if such a pressure-tight seal of the cylinder of the piston-cylinder unit in the receptacle of the hydraulics block is encompassed by the present invention. In accordance with example embodiments of the present invention, it is sufficient that a seal of the cylinder in the receptacle of the hydraulic pressures seals against essentially unpressurized leakage fluid.

At their circumference, the piston and the cylinder of the piston-cylinder unit enclose between them a cavity, which will here be referred to as leakage chamber. The leakage chamber is located on the circumference between the piston and the cylinder, i.e., externally on a circumference of the piston, and internally on a circumference of the cylinder. To form the leakage chamber, the piston may have on its outer circumference and/or the cylinder may have on its inner circumference depressions or the like. The leakage chamber accommodates and/or carries off leakage, especially drag leakage. Drag leakage generally denotes fluid, especially brake fluid, that leaks from a working chamber during a back-and-forth stroke of the piston in the cylinder and enters the area between the piston and the cylinder. The working chamber is a space inside the cylinder enclosed by the piston. Its volume alternately decreases and increases during the back-and-forth stroke of the piston in the cylinder, so that the piston-cylinder unit alternately displaces and aspirates fluid or brake fluid. In the present invention, such leakage, in particular drag leakage, ends up in the leakage chamber between the piston and the cylinder of the piston-cylinder unit at the outer circumference of the piston and at the inner circumference of the cylinder, where it is collected or carried off.

Advantageous developments and further refinements of the present invention are described herein.

In an example embodiment, a seal is provided which seals at the circumference of piston and cylinder between the piston and the cylinder. The seal is situated between the leakage chamber and the working chamber in order to protect the working chamber against leakage of fluid, or brake fluid, at the circumference between the piston and the cylinder. Fluid that may possibly escape beyond the seal, which is here referred to as leakage, enters the leakage chamber.

In an example embodiment, a reservoir is provided in the hydraulics block, which communicates with the leakage chamber. The reservoir allows for the accommodation of potential leakage from the working chamber of the piston-cylinder unit during a service life of a hydraulic non-muscular-energy vehicle brake system.

In an example embodiment, a piston-pump unit that includes a hydraulics block of the aforementioned type is provided. The piston-pump unit includes an electric motor and a gear unit for a linear drive of the piston in the cylinder of the piston-cylinder unit. The gear unit includes a helical gear or another gear unit or mechanical drive, which converts a rotary drive motion into a translatory output motion for the displacement of the piston. In addition, the gear unit preferably includes a step-down gear unit, which reduces a rotational speed of the electric motor and steps up a torque. Equipped with the gear unit and the electric motor, the hydraulics block including the piston-cylinder unit may be considered a piston-pump unit.

BRIEF DESCRIPTION OF THE DRAWINGS

Below, the present invention is described in greater detail on the basis of a specific embodiment shown in the figures.

DETAILED DESCRIPTION OF EXAMPLE EMBODIMENTS

Figure 1:
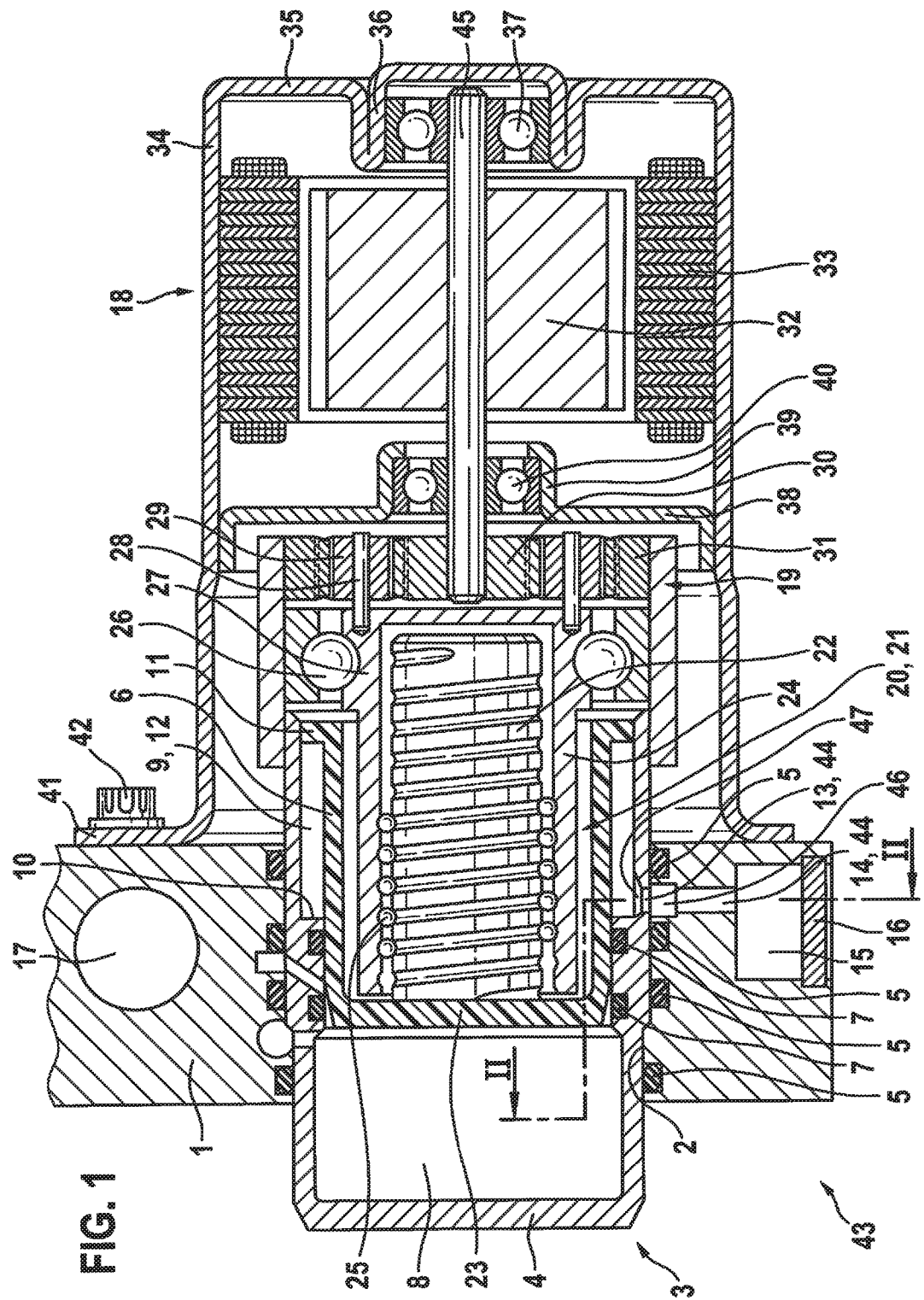
FIG. 1 shows an axial section of a hydraulics block according to the present invention, in a simplified and schematized depiction.
Figure 2:
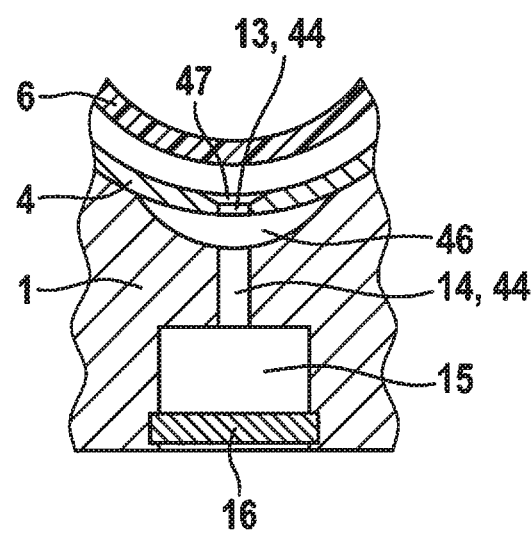
FIG. 2 shows a detail section along the line II-II in FIG. 1.

The figures show a hydraulics block 1 according to the present invention for a hydraulic non-muscular-energy vehicle brake system. Hydraulics block 1 is a box-shaped metal block made from an aluminum alloy, is nearly square in a plan view and approximately ⅓ to ¼ as thick as it is long or wide. Hydraulics block 1 has a receptacle 2 for a piston-cylinder unit 3. In the illustrated and described specific embodiment of the present invention, receptacle 2 is a cylindrical through hole in hydraulics block 1, but a blind hole (not shown), for example, would also be possible. In the illustrated and described specific embodiment, a cylinder 4 of piston-cylinder unit 3 penetrates receptacle 2 and projects from hydraulics block 1 on both sides. Cylinder 4 is sealed by a plurality of seals 5 in receptacle 2 of hydraulics block 1. In the illustrated and described specific embodiment, seals 5 are O-rings, which are situated in circumferential grooves on an inner circumference of receptacle 2.

A piston 6 is accommodated in cylinder 4 of piston-cylinder unit 3; it is able to move in the axial direction and is sealed with the aid of seals 7. Piston 6 delimits a working chamber 8 in cylinder 4 whose volume alternately increases and decreases with an axial back-and-forth stroke of piston 6 inside cylinder 4, whereby fluid is alternately displaced and aspirated in the manner known from piston pumps. In hydraulic vehicle brake systems, the fluid is a liquid, i.e. brake fluid. The back-and-forth travel of piston 6 in cylinder 4 of piston-cylinder unit 3 delivers brake fluid and generates a brake pressure for a non-muscular-energy braking operation.

In the illustrated and described specific embodiment, piston 6 is sealed by two seals 7 in cylinder 4, which are situated in circumferential grooves on an inner circumference of cylinder 4, one behind the other and set apart in the axial direction. The number of two seals 7 is not mandatory for the present invention, and it is also possible that seals 7 are situated in circumferential grooves in piston 6 (not shown). One seal 7, proximal to working chamber 8, forms a high-pressure seal that seals against a pressure prevailing inside working chamber 8. A seal 7, remote from working chamber 8, forms an insulation seal that is not exposed to any pressure or at most, is exposed only to low pressure. It seals against possible leakage that escapes through the high-pressure seal from working chamber 8 and protects the high-pressure seal from lubricants of, for instance, a helical gear 21 (to be discussed later) and a planetary gear 19. Instead of the illustrated O-rings, other seals may be used to seal piston 6 in cylinder 4, such as quad rings or lip seal rings.

Between them, piston 6 and cylinder 4 delimit a cavity 9 having a gap-shaped annular cross-section, which encloses piston 6 inside cylinder 4. Cavity 9 is situated on an outer circumference of piston 6 and on an inner circumference of cylinder 4. On the inside, it is delimited by piston 6, and on the outside, by cylinder 4; in the axial direction, it is bordered by an annular step 10 in cylinder 4 at one end, and by a flange 11 of piston 6 on an opposite-lying end. Cavity 9, which encloses piston 6 in cylinder 4, forms a reservoir for leakage that makes it past the two seals 7 and hereinafter, will be referred to as leakage chamber 12 in order to differentiate it from a still to be elucidated reservoir in hydraulics block 1. Seals 7, which seal piston 6 inside cylinder 5, are situated between leakage chamber 12 and working chamber 8. Possible leakage from working chamber 8, i.e., brake fluid or fluid in general, that leaks from seals 7 enters leakage chamber 12. Such leakage, for example, may be drag leakage, that is to say, brake fluid that adheres to the outer circumference of piston 6 and leaks at seals 7 due to the back-and-forth piston stroke of piston 6. Such leakage travels from leakage chamber 12 through a bore hole 13 in cylinder 4 and through a bore hole 14 in hydraulics block 1 and then enters a reservoir 15, which communicates with leakage chamber 12 via said bore holes 13, 14. In the illustrated and described specific embodiment of the present invention, reservoir 15 is a blind hole in hydraulics block 1, at the bottom of which bore hole 14 terminates and which is sealed with respect to the outside by a caulked lid 16, for instance, in a fluid-tight manner or in some other way. Also conceivable, for instance, is a dome-shaped cover which projects outwardly from hydraulics block 1 in order to enlarge a volume of reservoir 15 (not shown). The volume of reservoir 15 is sufficient to accommodate possible leakage that escapes past seals 7 over the entire service life of a hydraulic non-muscular-energy vehicle brake system.

Hydraulics block 1 has an intended, and usually structurally mandatory, installation position. In the intended or mandatory installation position of hydraulics block 1, reservoir 15 is situated underneath piston-cylinder unit 3, and bore holes 13, 14, through which reservoir 15 communicates with leakage chamber 12, are routed in the downward direction from leakage chamber 12 to reservoir 15. Bore holes 13, 14 may also be referred to as connection 44 of reservoir 15 to leakage chamber 12.

In receptacle 2 for cylinder 4, hydraulics block 1 has a groove 46 that extends in a circumferential direction for a limited distance. Groove 46 is situated underneath cylinder 4 in the intended installation position of hydraulics block 1. Bore hole 13 in cylinder 4 and bore hole 14 in hydraulics block 1 terminate in groove 46, so that groove 46 connects the two bore holes 13, 14 that form connection 44 of reservoir 15 to leakage chamber 12. Groove 46 ensures the connection of the two bore holes 13, 14 even if cylinder 4 has been installed in receptacle 2 in hydraulics block 1 in a slightly twisted manner.

On an inner side facing leakage chamber 12, cylinder 4 includes a counter bore 47, which has a conical or rounded shape, for instance, and is provided at an outlet of bore hole 13, in which possible leakage accumulates and is guided into bore hole 13 even if cylinder 4 has been installed in receptacle 2 of hydraulics block 1 in a slightly twisted manner in comparison with an intended installation position, or if hydraulics block 1 is installed slightly tilted in comparison with an intended installation position.

As previously mentioned already, cylinder 4 of piston-cylinder unit 3 is sealed with the aid of seals 5 in receptacle 2 in hydraulics block 1. In the axial direction of the piston-cylinder unit 3, seals 5 are situated on both sides of bore holes 13, 14 via which reservoir 15 communicates with leakage chamber 13, thereby preventing the exit of leakage.

A master brake cylinder bore 17 for the accommodation of one or more piston(s) of a master brake cylinder (not shown otherwise) is introduced in hydraulics block 1. The master brake cylinder is preferably developed as a dual-circuit master brake cylinder and has two pistons that are placed in master brake cylinder bore 17. Master brake cylinders are known as such and will not be discussed here in greater detail. For a non-muscular-energy vehicle brake system, the master brake cylinder is used as a setpoint pressure sensor for a brake-pressure generation using piston-cylinder unit 3 and for auxiliary braking in the event that piston-cylinder unit 3 or its drive, which will be discussed later, encounters a malfunction. The auxiliary braking operation is carried out using muscle power or via auxiliary power using muscle power supplemented by a brake booster.

For the linear drive of piston 6 in cylinder 4, hydraulics block 1 has an electric motor 18, the already mentioned planetary gear 19 and a ball screw drive 20, which generally may also be considered a helical-type gear 21. Electric motor 18, planetary gear 19 and a ball screw drive 20 are situated coaxially with respect to piston-cylinder unit 3. The greatest part of the axial length of ball screw drive 20 is situated within piston 6, which is developed in the form of a hollow piston. A spindle 22 is rigidly connected to a bottom 23 of piston 6. A ball screw nut 24 concentrically projects into an annular space between spindle 22 and piston 6 developed as a hollow piston. Spheres 25, which act as rolling elements, roll in helical troughs at the circumference of spindle 22 and in ball screw nut 24, so that ball screw drive 20 converts a rotary motion of its ball screw nut 24 into a displacement of spindle 22, which drives piston 6, rigidly connected to spindle 22, to execute the axial lifting motion in cylinder 4. Via a ball bearing 26, ball screw nut 24 is rotatably supported at an open end of cylinder 4 of piston-cylinder unit 3.

Ball screw nut 24 forms a planet carrier 27 of planetary gear 19. At its end face that projects from cylinder 4 and is remote from bottom 23 of piston 23, it includes axially parallel shafts 28, on which planet wheels 29 of planetary gear 19 are rotatably supported. Planet wheels 29 engage in a comb-like manner with a coaxial sun gear 30 and with a torsionally locked ring gear 31, which is likewise situated coaxially. In rotary driving of sun gear 30, planet wheels 29 are induced to rotary driving about shafts 28 and run along a circular path about sun gear 30 in ring gear 31. This circular motion of planet wheels 29 of planetary gear 19 in rotary driving of sun gear 30 drives ball screw nut 24 of ball screw drive 20 in a rotating manner. Ring gear 31 of planetary gear 19 is rigidly mounted on cylinder 4 of the piston-cylinder unit.

Sun gear 30 sits in a torsionally fixed manner on a motor shaft 45 of electric motor 18, whose rotor is denoted by 32 and whose stator is denoted by 33.

Electric motor 18 has a tubular motor housing 34, which is closed at one end face. A bottom 35 of motor housing 34 is provided with a gearing seat 36 for a motor bearing 37 via which motor shaft 31 is rotatably supported on a side of electric motor 18 that faces away from planetary gear.

An end shield 38 is situated between electric motor 18 and planetary gear 19 in motor housing 34 in a fluid-tight manner, for instance using press-fitting. End shield 38 has a bearing seat 39 that accommodates a second motor bearing 40, via which motor shaft 31 is rotatably supported between electric motor 18 and planetary gear 19. End shield 38 between electric motor 18 and planetary gear 19 ensures that lubricant from planetary gear 19, ball bearing 26 of ball screw nut 24 or from ball screw drive 20, as well as brake fluid that enters motor housing 34 as a result of possible leakage will not end up in electric motor 18. Fluid tightness at the circumference of end shield 38 between end shield 38 and motor housing 34 is sufficient for this purpose and no sealing is required in a center of end shield 38 at bearing seat 39. However, sealing is possible there, for instance between end shield 38 and motor shaft 31 (not shown), or the use of a sealed motor bearing 40, such as a ball bearing that is sealed on at least one side.

At its open end face, motor housing 34 includes a flange 41, which is connected to hydraulics block 1 by screws 42, for example, or which is mounted on hydraulics block 1 in some other manner. A portion of piston-cylinder unit 3 that projects from hydraulics block 1 on the side of electric motor 18, as well as ball screw drive 20 and planetary gear 19 are situated between end shield 38 and hydraulics block 1 inside motor housing 34. Together with electric motor 18, planetary gear 19, ball screw drive 20 and piston-cylinder unit 3, hydraulics block 1 forms a piston-pump unit 43 for generating a brake pressure of a hydraulic vehicle brake system produced through non-muscular energy with the aid of piston-cylinder unit 3 or through muscular or auxiliary power with the aid of the master brake cylinder integrated into hydraulics unit 1 for an auxiliary braking operation.

Further hydraulic components (not shown in the figures) such as solenoid valves, non-return valves, hydro-accumulators damping chambers and pressure sensors, are situated in hydraulics block 1 and hydraulically connected to one another by way of bore holes (not shown) of hydraulics block 1. Hydraulics block 1 thereby forms a hydraulics unit 1 of a slip control of the hydraulic non-muscular energy vehicle brake system. Such hydraulic power units are available in slip-controlled vehicle brake systems and are not be discussed here further.

What is claimed is:

1. A hydraulics block for a hydraulic vehicle brake system, comprising:
   a piston-cylinder unit including a cylinder accommodated in a fluid-tight manner in a receptacle of the hydraulics block;
   wherein a piston is in the cylinder, and the piston and the cylinder enclose between them a cavity as a leakage chamber; and
   wherein the leakage chamber communicates with a reservoir in the hydraulics block;
   wherein the cylinder has a bore hole which communicates with the leakage chamber, the hydraulics block has a bore hole which communicates with the reservoir, and the hydraulics block has a groove, through which the bore hole of the cylinder communicates with the bore hole of the hydraulics block; and
   wherein the leakage chamber communicates fluid from the leakage chamber to the reservoir in the hydraulics block via the bore hole of the cylinder, the groove of the hydraulics block, and the bore hole of the hydraulics block.

2. The hydraulics block as recited in claim 1, wherein the reservoir is situated underneath the piston-cylinder unit in an installation position of the hydraulics block.

3. The hydraulics block as recited in claim 1, wherein in the axial direction of the piston-cylinder unit, the hydraulics block has a seal between the cylinder and the receptacle for the piston-cylinder unit in the hydraulics block, the seal being situated on both sides of a connection of the leakage chamber to the reservoir.

4. A hydraulics block for a hydraulic vehicle brake system, comprising:
   a piston-cylinder unit including a cylinder accommodated in a fluid-tight manner in a receptacle of the hydraulics block;
   wherein a piston is in the cylinder, and the piston and the cylinder enclose between them a cavity as a leakage chamber;
   wherein the piston-cylinder unit has a seal between the piston and the cylinder situated between the leakage chamber and a working chamber enclosed by the piston in the cylinder;
   wherein the leakage chamber communicates with a reservoir in the hydraulics block;
   wherein the cylinder has a bore hole which communicates with the leakage chamber, the hydraulics block has a bore hole which communicates with the reservoir, and the hydraulics block has a groove, through which the bore hole of the cylinder communicates with the bore hole of the hydraulics block; and wherein the leakage chamber communicates fluid from the leakage chamber to the reservoir in the hydraulics block via the bore hole of the cylinder, the groove of the hydraulics block, and the bore hole of the hydraulics block.

5. A hydraulics block for a hydraulic vehicle brake system, comprising:
- a piston-cylinder unit including a cylinder accommodated in a fluid-tight manner in a receptacle of the hydraulics block;
- wherein a piston is in the cylinder, and the piston and the cylinder enclose between them a cavity as a leakage chamber;
- wherein the hydraulics block has a master brake cylinder bore hole;
- wherein the leakage chamber communicates with a reservoir in the hydraulics block;
- wherein the cylinder has a bore hole which communicates with the leakage chamber, the hydraulics block has a bore hole which communicates with the reservoir, and the hydraulics block has a groove, through which the bore hole of the cylinder communicates with the bore hole of the hydraulics block; and
- wherein the leakage chamber communicates fluid from the leakage chamber to the reservoir in the hydraulics block via the bore hole of the cylinder, the groove of the hydraulics block, and the bore hole of the hydraulics block.

6. A piston-pump unit, comprising:
- a hydraulics block for a hydraulic vehicle brake system, the hydraulics block including a piston-cylinder unit including a cylinder accommodated in a fluid-tight manner in a receptacle of the hydraulics block, wherein a piston is in the cylinder, and the piston and the cylinder enclose between them a cavity as a leakage chamber;
- wherein the hydraulics block has a gear and an electric motor for driving the piston in the cylinder, and the hydraulics block includes a seal, which seals in the receptacle for the piston-cylinder unit in the hydraulics block between the cylinder of the piston-cylinder unit and the hydraulics block, the seal being situated between a connection of a reservoir to the leakage chamber, and the electric motor.

7. A piston-pump unit, comprising:
- a hydraulics block for a hydraulic vehicle brake system, the hydraulics block including a piston-cylinder unit including a cylinder accommodated in a fluid-tight manner in a receptacle of the hydraulics block, wherein a piston is in the cylinder, and the piston and the cylinder enclose between them a cavity as a leakage chamber;
- wherein the hydraulics block has a gear and an electric motor for driving the piston in the cylinder, the electric motor has a motor housing, which is mounted on the hydraulics block, and the electric motor has an end shield between the electric motor and the gear.

* * * * *